United States Patent [19]

Olson et al.

[11] Patent Number: 4,732,877

[45] Date of Patent: Mar. 22, 1988

[54] ALUMINA COMPOSITE REINFORCED BY ZIRCONIA-CLAD ALUMINA FIBERS

[75] Inventors: William L. Olson; Keith R. Karasek, both of Elk Grove, Ill.

[73] Assignee: Allied-Signal Inc., Morristown, N.J.

[21] Appl. No.: 859,667

[22] Filed: May 5, 1986

Related U.S. Application Data

[63] Continuation-in-part of Ser. No. 781,548, Sep. 30, 1985, abandoned.

[51] Int. Cl.$^4$ .................. C04B 35/02; C04B 35/10; C04B 35/48
[52] U.S. Cl. ........................... 501/95; 501/105; 501/153; 501/127; 428/699; 428/701
[58] Field of Search ............... 501/95, 105, 153, 127; 428/699, 701

[56] References Cited

U.S. PATENT DOCUMENTS

| | | | |
|---|---|---|---|
| 4,459,372 | 7/1984 | Arena | 502/351 |
| 4,543,345 | 9/1985 | Wei | 501/95 |
| 4,569,886 | 2/1986 | Divecha et al. | 428/379 |

FOREIGN PATENT DOCUMENTS

| | | | |
|---|---|---|---|
| 130105 | 1/1985 | European Pat. Off. | 501/95 |
| 53-103027 | 9/1978 | Japan | 427/215 |
| 53-103096 | 9/1978 | Japan | 427/215 |
| 60-200866 | 10/1985 | Japan | 501/95 |
| 1146296 | 3/1985 | U.S.S.R. | 501/105 |

OTHER PUBLICATIONS

J. Am. Ceram. Soc., 59(1–2), 49(1976).
Bull. Am. Ceram. Soc., 64 (2) 298(1985).

*Primary Examiner*—Mark L. Bell
*Assistant Examiner*—A. Knab
*Attorney, Agent, or Firm*—Thomas K. McBride; John F. Spears, Jr.; Eugene I. Snyder

[57] ABSTRACT

Alumina fibers whose surface is coated with zirconia to retain their identity in an alumina matrix when the mixture is sintered at temperatures needed to form a fully dense ceramic. The resulting fully dense ceramic composite shows the beneficial effects of such reinforcing fibers by having increased crack toughness.

8 Claims, No Drawings

ALUMINA COMPOSITE REINFORCED BY ZIRCONIA-CLAD ALUMINA FIBERS

CROSS-REFERENCE TO RELATED APPLICATION

This application is a continuation-in-part of our copending application, Ser. No. 781,548, filed Sept. 30, 1985, now abandoned, which is incorporated by reference.

BACKGROUND OF THE INVENTION

This application relates to fully dense, reinforced ceramic composites whose improved strength and toughness make their mechanical and structural properties more desirable, and relates particularly to a fully dense alumina composite reinforced by zirconia-clad alumina fibers. The invention which is the subject matter herein results from our solution to the problem of alumina reinforcing fibers dissolving in the alumina matrix under conditions necessary to achieve densification, a problem which if addressed at all certainly has not been solved heretofore.

Ceramics normally exhibit very poor fracture toughness and thermal shock resistance which limits their use as structural components in, for example, heat engines and turbines. For example, alumina is a rather low cost ceramic which could be used far more extensively if it did not exhibit these characteristics. Over the last few years two general methods have been developed to toughen ceramics; transformation toughening and fiber toughening.

Transformation toughening arises from the addition of a second oxide, commonly zirconia, which shows a phase transformation during processing. In the case of zirconia, there is a high temperature tetragonal phase and a low temperature monoclinic phase of lower density. When this phase transition occurs during processing, the volume expansion causes microcracks to form around zirconia particles in a ceramic matrix. A propagating crack will upon hitting this particle be split into several parts and the energy of the crack is thereby dissipated. Alternately, it is possible to retain metastable tetragonal phase zirconia particles in ceramic matrices. When a propagating crack approaches such a particle the large tensile stresses ahead of a crack tip causes the zirconia to undergo a phase transformation. The resulting volume expansion places the matrix in compression near the particle, stopping the propagating crack. See, for example, N. Claussen, *J. Am. Ceram. Soc.*, 59 (1-2), 49 (1976).

Another method for increasing fracture toughness is by incorporation of high strength fibers into the ceramic matrix. It is believed that the fibers tend to retard crack propagation by absorbing energy when the fiber is pulled from the surrounding metal oxide matrix. Additionally, cracks may be deflected and branch when they hit the fiber-matrix interface. An example of this form of toughening is an alumina matrix reinforced with silicon carbide whiskers. G. C. Wei and P. F. Becker, *Bull. Am. Ceram. Soc.*, 64 (2), 298 (1985); G. C. Wei, U.S. Pat. No. 4,543,345. However, there are several disadvantages associated with the use of silicon carbide whiskers as reinforcing fibers. One is that such whiskers currently are quite expensive. Another is that a number of physical properties, such as electrical and thermal conductivities, of silicon carbide are quite different than those of alumina, and since an appreciable volume fraction of reinforcing fibers (5-60 volume percent) may be used the physical properties of the resulting composite can be significantly different than those of alumina.

Alumina-based fibers are relatively well known and commercially available. These are relatively inexpensive in comparison with silicon carbide whiskers and have reasonably good mechanical properties. It is highly desirable to reinforce alumina with such fibers not only because of their low cost, but also because the physical properties of the resulting composite would be unchanged by the addition of such fibers. Attempts to prepare porous alumina composites containing high strength alumina fibers have been successful, as exemplified by European patent application 130-105. Applicants there disclose composites which include an alumina fiber reinforced alumina matrix, but an essential limitation is that the composite have at least 30% porosity. In the context of this application, porosity is $100 \cdot [1-(y/x)]$, where y is the measured density, and x is the theoretical full density. The resulting composites are not strong, tough ceramics which retain these structural properties even in the severe thermal environment (>1500° C.) of an internal combustion engine, as are the ceramics of this invention, but instead are materials used in refractory applications where strength and toughness are not critical, e.g., in furnace construction. In fact, it is well known that porosity detracts from toughness; cf. U.S. Pat. No. 4,543,345, column 4, at lines 55-6.

Whereas efforts to prepare porous alumina composites containing high strength alumina fibers have been successful, efforts to prepare fully dense alumina composites reinforced by alumina fibers have been unsuccessful. In the context of this application "fully dense" refers to material having at least 95% of the theoretical density of the ceramic material. The prior failures appear to arise from the necessity of sintering the composite to achieve densification. It is well known that an alumina composite needs to be heated under pressure at a temperature of at least about 1400° C., and up to about 1900° C., in order to provide a composite with essentially the full theoretical density of the ceramic, and that essentially 99% of the theoretical density is required to obtain the maximum toughness and strength. However, at the sintering temperatures necessary to achieve densification the alumina fibers dissolve into the surrounding aluminum oxide matrix, destroying the reinforcing fiber network. Thus, whereas the composite of EP 130,105 retains its fiber network because it is sintered at only 800° C., were it processed to full density by, e.g., hot pressing at 1500° C. there would be a loss of fibrous microstructure with resulting formation of a simple alumina body.

The problem which heretofore was an absolute barrier to the preparation of fully dense alumina fiber reinforced alumina composites was dissolution of the alumina fibers in the alumina matrix during the thermal treatment needed for densification. It seemed to us that the presence of a diffusion barrier between the alumina fibers and alumina matrix might be a solution to the aforementioned problem by preventing such dissolution and thereby allowing the presence of discrete high strength alumina fibers in an alumina composite. It appeared to us that encasing the alumina fibers in a sheath of zirconia would eliminate the dissolution of the fibers at high temperature into the surrounding ceramic matrix because zirconia and alumina are mutually insoluble. That is, zirconia does not dissolve in alumina nor does alumina dissolve in zirconia, and such a sheath or coating would maintain the integrity of alumina fibers in an alumina matrix during sintering. The formation of a more-or-less uniform coating of zirconia on the fiber surface should significantly impede degradation of the fiber within the matrix and thereby preserve the intended improvement of the material's fracture toughness and strength due to the fibers present. It is also possible that the zirconia coating, if present as the metastable tetragonal phase, could improve the toughness of the composite by conventional transformation mechanisms.

As is elaborated upon within, the zirconia sheath or coating described in this invention is not merely a physical deposition of discrete zirconia particles on the surface of alumina fibers, but rather chemical bonding of discrete oxygenated zirconium species to the surface of alumina. That is, the resulting fibers are surface-zirconated much as is described in U.S. Pat. No. 4,459,372. A key advantage to the coating methods used is the possibility of preparing coatings of controlled thickness by careful, surface-dominated reaction chemistry.

SUMMARY OF THE INVENTION

The purpose of this invention is to prepare alumina ceramics reinforced with alumina fibers. Another purpose of this invention is to prepare alumina ceramics which exhibit increased fracture toughness. An embodiment comprises an alumina ceramic composite containing zirconia-clad alumina fibers. In a more specific embodiment the fibers contain from about 0.2 to about 2.0 weight percent zirconia. Other embodiments will be apparent from the subsequent description.

DESCRIPTION OF THE INVENTION

This invention stems from the discovery that zirconia-clad alumina fibers retain their discrete identity in an alumina matrix upon sintering the mixture. It is believed that oxygenated species of zirconium are bound to the surface of such fibers and form a barrier to the diffusion of alumina, thereby preventing the dissolution of alumina from the fibers in the alumina of the surrounding matrix, although it is emphasized that the successful practice of this invention is independent of any such hypothesis. However, this hypothesis is helpful in understanding and applying the invention herein.

In this application the terms "zirconia-coated alumina" and "zirconia-clad alumina" are interchangeable and refer to a surface-zirconated alumina, i.e., oxygenated zirconium species chemically bonded to the surface of alumina. As is described in U.S. Pat. No. 4,459,372, it is believed that the surface hydroxyl groups of alumina react with various zirconium tetrahalides with formation of an oxygen-metal bond. The halogens remaining bonded to the metal may be converted to oxygens, leading to the surface-zirconated alumina fibers of this invention. The reactions thought to occur are represented by the following scheme, where X is a halogen, ⌇⌇⌇⌇ is an alumina surface, and where the last structure represents a surface-zirconated alumina.

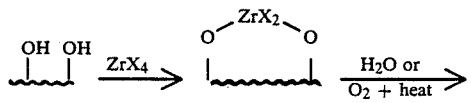

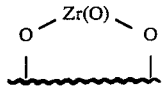

Although the above equation represents reaction of two of the four halogens with surface hydroxyls, it must be understood that from one to all four halogens may react, with a corresponding change in the final structure of the surface-zirconated alumina. It is to be clearly understood that the zirconia-clad alumina includes all the surface-zirconated species which may be so formed.

As the last structure suggests, the zirconium from surface-zirconation forms an oxide layer on each surface of the alumina. Conceptually, this is tantamount to each crystallite of alumina being more-or-less encased in a thin shell of zirconia. Because of the mutual insolubility of zirconia and alumina, such a shell provides a diffusion barrier during sintering, and thus the alumina fibers retain their discrete identity in the alumina matrix.

As the skilled worker will understand the alumina fibers used in the practice of this invention are not necessarily pure alumina but may contain significant quantities of other materials. For example, commercial alumina fibers often contain oxides of iron, titanium, and silicon as naturally occurring components of manufacture, and may contain other refractory metal oxides as well. Such fibers also may have added to them magnesium, calcium, and/or zinc oxide as sintering aids, as well as other additives to aid in their processing or to impart some desirable traits. It is important to recognize that when "alumina fibers" are referred to there is intended materials which are chiefly alumina but which may contain significant amounts of other components which will not appreciably affect surface-zirconation.

To prepare the surface-zirconated alumina fibers of this invention one may react the fibers with a zirconium tetrahalide. Reaction of the zirconium tetrahalide with the alumina fiber may be effected by contacting a solution of the tetrahalide in a nonaqueous, nonhydroxylic solvent, or by vapor deposition of the tetrahalide where its vapor pressure is sufficient. Zirconium tetrafluoride, tetrachloride, and tetrabromide are sufficiently volatile to permit vapor deposition.

Where a solution of a zirconium tetrahalide is used suitable solvents include diethylether, dipropylether, tetrahydrofuran, tetrahydropyran, other ethers, ethylacetate, propylacetate, butylacetate, and other esters, all of which are merely illustrative of usable solvents and are not in any way exhaustive. The concentration of zirconium tetrahalide is not important except insofar as it may effect reaction time. Surface zirconation is achieved merely by mixing the solution with alumina fibers until reaction is complete, or until the extent of surface zirconation desired is achieved. Typical reaction times are from about ½ to about 5 minutes. Excess liquid then is removed by decantation and/or filtration and the solid is recovered.

Where the vapor pressure of the zirconium tetrahalide permits, vapor deposition may be the method of choice for converting the surface hydroxyls of the alumina fiber to metallated specie. One reason is that it permits facile control of the amount of zirconium introduced. Another reason is that, in contrast to the aforementioned method, no excess adhering but unbound zirconium tetrahalide remains to be removed, thereby eliminating an entire step in the preparation.

Vapor deposition is done conveniently by contacting a stream of inert gas containing vapors of zirconium tetrahalide with alumina fibers. Suitable inert gases include nitrogen, helium, argon, and the remaining inert group gases. Where the gas stream is passed through a bed of alumina fibers the amount of surface metallation may vary with bed temperature, thereby affording some degree of control of metallation.

When the surface-zirconation is performed using a solution of zirconium tetrahalide, excess adhering but unbound halide must be removed. Where the halide is sufficiently volatile one method of removal is by heating the treated fibers in an inert atmosphere. The temperature would depend on such factors as inert gas flow and the specific tetrahalide used. Another means of removing excess adhering but unbound tetrahalide is by washing the treated fibers with copious quantites of solvent. The aforementioned solvents used to prepare solutions by which the alumina is metallated also may be used for the washing step and are not here repeated.

The surface-zirconated alumina fibers are then calcined in air at a temperature from about 200° to about 900° C. for at least 0.25 hours. Especially at lower temperatures a longer calcination time may be necessary, but generally the time will not exceed about 1 hour. Longer times are not detrimental but also may be superfluous. Such calcination replaces all halogens bound to zirconium with oxygen, as described in the equation above. The result of such a calcination is a zirconia-clad alumina fiber.

The process of surface-zirconation and calcination may be repeated several times to vary the amount of zirconium which reacts with the alumina, or to vary the thickness of the resulting zirconia coating. Although in principal only a single contacting stage with a zirconium tetrahalide is required, it has been found quite helpful to effect surface-zirconation by repeated treatment of the alumina fiber with a zirconium tetrahalide. Although as little as about 0.05% by weight, calculated as zirconia, may be deposited, perhaps up to as much as about 5% by weight, more typically the fibers contain from about 0.2 to about 2.0% by weight zirconia.

The zirconia-coated fibers are then mixed with alumina and the mass is shaped and sintered. As is the case for fibers, the term "alumina" as applied to the matrix includes alumina containing significant amounts of other components. Thus, commercial alumina may contain other refractory metal oxides, such as those of iron, titanium, and silicon normally attending the manufacturing process. The alumina also may contain significant amounts of other components deliberately added to impart selected traits or properties. For example, the alumina may contain an additive to control its thermal coefficient of expansion, such as the silica-alumina known as mullite alumina. Additives to influence its electrical and thermal conductivity, its dielectric constant, and grain growth inhibitors also may be present, and are exemplified by such materials as lithium oxide, sodium oxide, chromium oxide, strontium titanate, and nickel oxide. Sintering aids such as the oxides of calcium, magnesium, and zinc also may be present, as may be densification aids, organic binders and/or dispersants, such as ethylene glycol, polyethylene glycol, propylene glycol, polypropylene glycol, glycerine, and di-isopropanol amine. The list above is not exhaustive but is only exemplary of other components which may be present in the alumina matrix. One practicing this art will recognize other components present, or which may be present, in the alumina matrix.

As previously stated the mixture of fibers and alumina are shaped and sintered. The sintering is performed at a temperature and for a time sufficient to achieve maximum densification. Except for a very low volume fraction of reinforcing fiber, application of pressure will be necessary for full densification. Standard processing techniques which provide such pressure include uniaxial hot pressing and hot isostatic pressing. For example, typical sintering conditions may include a temperature from about 1400° to about 1600° C. for a time from about 1 to about 5 hrs.

The amount of zirconia-clad fibers used in the resulting alumina ceramic composite is subject to broad variation. Quite typically as little as about 2% by weight fibers may be present, or the ceramic may contain as much as about 50% by weight of the fibers.

The following examples are merely illustrative of our invention which is not intended to be limited thereto.

EXAMPLE 1

10.6 g of Reynolds high-purity alumina (RC-HP DBM without MgO) powder was mixed with 0.098 g Saffil (trademark of Imperial Chemical Industries PLC; 96–97% alumina, 3–4% silica, trace amounts of iron, chromium, nickel, sodium, magnesium, calcium, and chloride, none exceeding about 900 ppm) alumina fibers in methanol. Small amounts of two organic binders, polyvinylalcohol (0.183 g) and polyethyleneglycol (0.182 g), were added to the mixture to give the green compacts additional strength. They would be driven off at temperatures much less than 1000° C. A small amount (0.016 g, about 0.2% of powder) of MgO, a standard sintering aid for alumina which hinders rapid grain growth, also was added. The mixture was then dried. Subsequently, the powder was ground in a mortar and pestle and screened through a 500 micron sieve. Two 1 g samples were taken from this powder. These were uniaxially pressed at 10 ksi pressure and cold isostatically pressed at 30 ksi.

The pellets were sintered according to the following program: 3 hours, room temperature to 1000° C.; 2 hours, 1000° C. to 1600° C.; 2 hours, 1600° C. hold; 2 hours, 1600° C. to 1000° C.; 1 hour, 1000° C. to 500° C.; free cool. (The actual temperature seen by the samples would be about 25° C. less than the set temperature.)

Following the sintering, one of the pellets was broken apart and the fracture surface was observed on the scanning electron microscope. There was no evidence of fiber retention. In fact, a grain structure was observed which indicated the presence of a grain boundary phase, further indicating that the Saffil fibers dissolved into the matrix.

This experiment shows unambiguously and unequivocally that unclad alumina fibers dissolve into the alumina matrix when the composite is sintered at temperatures needed to achieve a fully dense ceramic.

EXAMPLE 2

A small quantity of the alumina fibers described in the prior example was coated three times with zirconia. To a suspension of 0.1 g of zirconium tetrachloride in 100 ml diethyl ether under an inert atmosphere was added 3 g of alumina fibers, and the mixture was stirred vigorously for 2.5 hrs. The fibers were separated by filtration, then placed in a muffle furnace in air at 360° C. for 0.5 hrs. The brown fibers which resulted were cooled to room temperature and again added to the aforementioned zirconium tetrachloride solution for an additional 0.5 hrs. The isolation and calcining procedures were repeated twice more with the last calcination cycle going up to 750° C. for 0.5 hrs. to oxidize any residual organic materials on the fibers. The resulting fibers were white in color and close in appearance to that of the original uncoated material.

These coated fibers were then mixed with alumina powder with the aid of an ultrasonic probe in a beaker containing methanol to afford a 0.05 volume fraction composite. The mixture was dried and the resulting powder was ground in a mortar and pestle, then screened through a 250 micron sieve. This powder was then cold isostatically pressed at 30,000 pounds per square inch. The pellets were then sintered at 1575±25° in air for 2 hours. SEM photographs of the sintered specimens clearly show that the fibrous microstructure has been retained. Thus, the zirconia-coating has achieved its purpose as a diffusion barrier, preventing the fibers from dissolving in the matrix. Emission analyses performed on the coated fibers showed 0.46, 0.69, and 0.99% by weight, calculated as $ZrO_2$, for samples subjected to one, two, and three coatings, respectively.

What is claimed is:

1. A fully dense ceramic composite comprising an alumina matrix containing surface zirconated alumina fibers.

2. The composite of claim 1 where the fibers constitute from about 2 to about 50 weight percent of said composite.

3. The composite of claim 1 where the surface-zirconated fibers contain from about 0.05 to about 5.0 weight percent zirconia.

4. The composite of claim 3 where the fibers have from about 0.2 to about 2.0 weight percent zirconia.

5. A method of making a fully dense alumina ceramic composite containing discrete alumina fibers comprising zirconating the surface of alumina fibers to afford surface zirconated alumina fibers, mixing the surface zirconated fibers with alumina, and sintering the mixture under pressure to form a fully dense ceramic composite.

6. The method of claim 5 where the surface zirconated fibers contain from about 0.05 to about 5.0 weight percent zirconia.

7. The method of claim 6 where the fibers contain from about 0.2 to about 2.0 weight percent zirconia.

8. The method of claim 5 where the surface zirconated fibers constitute from about 2 to about 50 weight percent of the composite.

* * * * *